United States Patent [19]
Rianda et al.

[11] Patent Number: 5,833,278
[45] Date of Patent: Nov. 10, 1998

[54] MULTIPLE LINE COMPRESSION FITTING ASSEMBLY

[76] Inventors: Kent A. Rianda, 541 Monterey Pines, Mammoth Lakes, Calif. 93546-1734; Frank F. Hayes, Jr., 11620 Warner Ave., Apt. 621, Fountain Valley, Calif. 92708

[21] Appl. No.: 878,445

[22] Filed: Jun. 18, 1997

[51] Int. Cl.$^6$ .................................................. F16L 35/00
[52] U.S. Cl. ..................................... 285/124.1; 285/124.4
[58] Field of Search ........................... 285/124.1, 124.2, 285/124.3, 124.4, 124.5, 118, 246, 247, 913, 914

[56] References Cited

U.S. PATENT DOCUMENTS

| | | | |
|---|---|---|---|
| 626,447 | 6/1899 | Strater | 285/124.1 |
| 2,628,850 | 2/1953 | Summerville | 285/124.1 |
| 4,007,951 | 2/1977 | Legris | 285/124.5 |
| 4,319,772 | 3/1982 | Weirich et al. | 285/124.5 |
| 4,345,786 | 8/1982 | Egert | 285/124.4 |
| 4,367,888 | 1/1983 | Leverberg | 285/124.1 |
| 4,378,124 | 3/1983 | Weirich et al. | 285/124.4 |
| 4,544,185 | 10/1985 | Weirich et al. | 285/124.4 |
| 4,770,207 | 9/1988 | Hofmann | 285/124.4 |
| 4,995,646 | 2/1991 | Johnston et al. | |
| 5,056,829 | 10/1991 | Kramer | 285/124.1 |
| 5,316,347 | 5/1994 | Arosio | 285/124.4 |
| 5,655,794 | 8/1997 | Sell | 285/914 |

FOREIGN PATENT DOCUMENTS

| | | | |
|---|---|---|---|
| 233189 | 7/1977 | France | 285/118 |
| 61399 | 4/1968 | Germany | 285/118 |
| 3011226 | 10/1981 | Germany | 285/118 |
| 1164335 | 9/1969 | United Kingdom | 285/118 |

*Primary Examiner*—Eric K. Nicholson
*Attorney, Agent, or Firm*—Harold L. Jackson

[57] ABSTRACT

A multiple flare-type compression fitting comprises a body member having a plurality of axially extending hollow nipples positioned adjacent one end (or both ends). One or more passageways within the body member communicate with the passageways in the nipples. A compression disk has cooperating stepped passageways with the enlarged sections arranged to surround the outer wall of an associated nipple with a flexible tube extending thereover, with the narrow sections accommodating the passage of the flexible tubes therethrough. The junction between the enlarged and narrow sections of each disk passageway form a relatively sharp corner for compressing a tube against the associated nipple when the disk is seated against the body member. The compression disk is rotatably carried by a nut which engages external threads on the body member so that when the nut is tightened the compression disk is in a seated position to secure the tubes in place. Anti-rotation elements such as one or more bores in the body member and cooperating pins on the compression disk inhibit rotational movement of the disk relative to the body member during the tightening procedure.

12 Claims, 2 Drawing Sheets

MULTIPLE LINE COMPRESSION FITTING ASSEMBLY

FIELD OF THE INVENTION

The present invention relates to a multiple line compression fitting assembly and more particularly to such an assembly for connecting multiple flexible tubes to a manifold or interconnecting such tubes through a wall or partition.

BACKGROUND OF THE INVENTION

The use of tubing, e.g., thermoplastic tubing, to transfer fluid in the food processing, semiconductor and many other industries is commonplace. In many pieces of automatic processing equipment there are an abundance of tubes seemingly running everywhere and usually in and around confined space to various components of the equipment. In many cases there is a need to make the conversion from a large tube (or pipe) to multiple smaller tubes or to pass multiple individual tubes through a wall or bulkhead, especially where there is a requirement that the bulkhead be watertight.

In the first application the traditional approach is to either use several T-fittings (and often in conjunction with reducers) or to manufacture a special manifold to accommodate the individual tubes. In the second application the traditional approach is to simply use multiple single connection bullhead fittings to pass each individual tube through a wall. This requires the drilling of multiple holes and the installation of multiple fittings into the wall followed by the connection of the individual tubes. A relatively large area is needed to provide sufficient room to reach in and tighten each fitting.

The fittings can be of the compression ferrule-type in which a ferrule makes a compression seal around the circumference of the tube or a flare fitting in which the tube is inserted over a nipple and secured thereto by a nut which pinches the inside corner of the nut against the portion of the tubing at the terminal end of the nipple.

Conventional compression fittings have the disadvantage that the tube material will tend to cold flow (creep) under load, especially when there are elevated temperatures. Over a period of time or after temperature cycling, the creep reduces the compressive force which provides the seal in that the tubing has simply moved away from the ferrule.

The temperature plays into it, first, in that the amount of creep is enhanced due to the softening of the thermoplastic material, and second, because the thermal expansion of the tube material also causes increased loads, again increasing the amount of creep. When the tube and fitting are cooled thermal contraction occurs and there is no longer enough compression of the ferrule against the tube, and the fitting leaks.

Pull out resistance may also be a problem with compression fittings. In the past, serrated gripper members which dig into the tube around it's circumference have been used to alleviate this problem. However, such members have their own limitations and disadvantages.

U.S. Pat. No. 4,995,646 to Johnston et al discloses a connector assembly for allowing a plurality of tubular lines to pass through a wall or partition. However, this connector is not only complex and therefore expensive to manufacture, it suffers from the above creep problem because ferrules are used to provide the compressive seal. In addition, the compression disk 40 of the Johnston et al connector will tend to rotate with the nut 46 and apply a nonuniform pressure to the ferrules. This in turn will tend to aggravate the creep problem.

Flare fittings eliminate the need for gripping members and overcome the creep problem (associated with ferrule type connections) to a large extent due to the large amount of material that would be necessary to be pulled through the pinched area between the inside corner of the nut and nipple on the fitting body. However, it is important that the compressive forces be evenly distributed around the circumference of the tube, nipple and nut interface. In a single flare fitting this is typically not a problem. The application of non-uniform compressive forces can be a problem where multiple tubes are to be connected in a single fitting because the tubes are spaced from the axis of the fitting.

There is a need for a simple and relatively inexpensive multiple line compression flare fitting which is capable of connecting a plurality of individual flexible tubes to a common conduit or of interconnecting individual tubes to accommodate the passage of such tubes through a wall or bulkhead, while ensuring an even distribution of the compressive forces.

SUMMARY OF THE INVENTION

It is, therefore the general objective of this invention to provide a new and improved apparatus, in the form of a body member, a nut, and a compression disk for transferring fluid either from a single source or plural sources to plural destinations in a single fitting assembly using flexible conduits for distribution, primarily thermoplastic tubing.

It is a particular objective of this invention to incorporate an anti-rotational means carried by the body member and the compression disk to prevent rotation of the disk relative to the body member as the nut is tightened onto the body member to thereby ensure a uniform compression load around the circumference of the tubular conduits when the nut is tightened onto the body member.

It is another particular objective of this invention that the compression disk interface provides a superior tension load (pull out) resistance that does not rely upon serrations of the nipple body, thereby preserving the structural integrity of the flexible conduit.

It is another general objective of this invention to provide a single, relatively inexpensive fitting to act as a manifold for the distribution of a fluid.

A multiple flare-type compression fitting, in accordance with the present invention, includes a body member having a longitudinal axis and external threads on at least one end thereof. A plurality of axially extending nipples or posts are positioned adjacent the threaded end with each of the posts defining an inner passageway therethrough. The body member has at least one internal passageway in fluid communication with the passageways in the posts.

A compression disk, having a longitudinal axis, defines an axial passageway aligned with each post passageway, when the longitudinal axes of the body member and the disk are coincident. Each passageway in the disk has a narrow section for receiving one of the conduits and an enlarged section for surrounding the outer wall of one of the posts with the terminal end of one of the conduits extending thereover. The junction of the narrow and enlarged section of each passageway in the disk forming a relatively sharp corner for compressing the tube against the end of the associated post when the disk is in its seated position against the body member.

The compression disk is rotatably carried by a nut having threads which engage the threads on the body member.

Tightening the nut on the body member moves the disk into its seated position.

The body member and compression disk are provided with anti-rotation elements which prevent the disk from rotating relative to the body member as the nut is tightened to thereby substantially prevent the application of non-uniform compressive forces on the outer walls of the tubes.

The features of the present invention can best be understood by reference to the following description taken in conjunction with the accompanying drawings in which like parts are given the same reference numeral throughout the several figures.

DESCRIPTION OF THE PREFERRED EMBODIMENT

Figure 1:
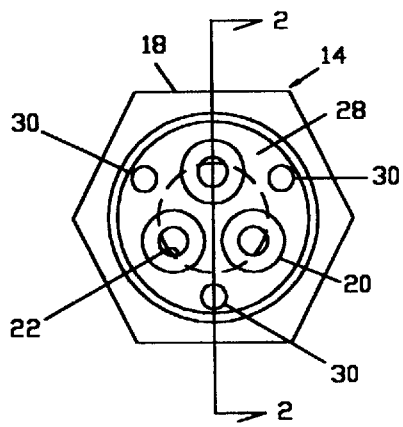
FIG. 1 is an end view of the fitting body of FIG. 1 for use in the assembly of the present invention.
Figure 2:
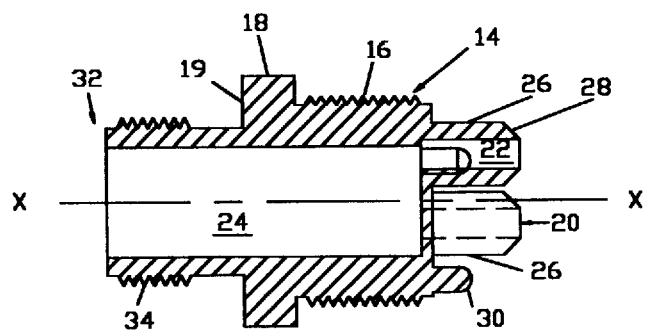
FIG. 2 is a cross-sectional view of the fitting body of FIG. 1 taken along lines 2—2.

Referring now to the drawings and particularly to FIGS. 1 and 2, a fitting body 14, having a longitudinal axis x—x is provided with external threads 16 at the distal end thereof for receiving a nut to be described. The body member 14 is formed with a hexagonally faceted flange section 18. The facets on the flange serve as a wrench engaging surface for stabilizing the body member during assembly. The vertically oriented sides 19 of the flange 18 may also serve to attach the body member to a bulkhead (not shown). A plurality of nipples or cylindrical posts 20 extend axially (parallel to the longitudinal axis) from the distal end of the body member. The posts 20 have passageways 22 therethrough which are in fluid communication with an internal passageway 24 in the body member. Each post or nipple has an outside wall which includes a cylindrical portion 26 for receiving a tubular conduit (as will be explained) and a tapered or chamfered portion 28 at the free end thereof against which the tube surrounding the post will be pinched by a compression disk to be discussed.

Three anti-rotation pins (or latches) protrude axially from the distal end of the body member for preventing the rotation of a compression disk 36 which secures the tubes in place over the nipples. The compression disk will be described in conjunction with FIGS. 3–5. The proximal end 32 of the body member is provided with any suitable connecting means such as the threads 34 to enable the body member to be coupled to a conduit, pipe etc. It should be noted that the proximal end of the body member need not be threaded, but may be coupled to a pipe or conduit by conventional cement or fusion welding as is commonly done with PVC; PVDF or polypropylene conduits.

Figure 3:
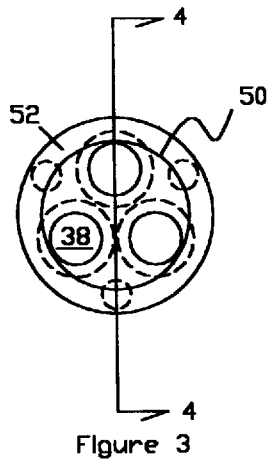
FIG. 3 is an end view of a compression disk for use in the assembly of FIG. 3.
Figure 4:
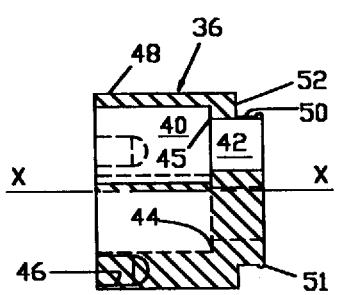
FIG. 4 is a cross-sectional view of a compression disk of FIG. 3 taken long lines 4—4 of FIG. 3.
Figure 5:
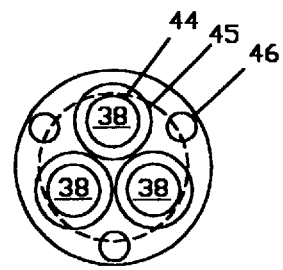
FIG. 5 is another end view of the compression disk, opposite the view shown in FIG. 4.
Figure 8:
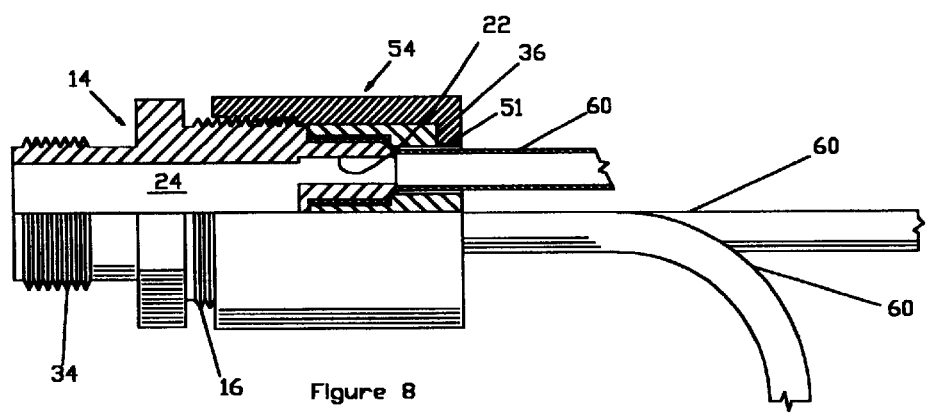
FIG. 8 is a side elevational view, partially cut away, of the fitting body, compression disk and the nut in an assembled condition with tubing installed.

Referring now to FIGS. 3–5, the cylindrical compression disk 36 has a longitudinal axis x—x and is provided with three stepped bores 38 arranged symmetrically around the axis. The stepped bores are aligned with respective passageways 22 in the posts when the longitudinal axes of the disk and body member are coincident. Each stepped bore includes an enlarged section 40 and a narrow section 42 as is illustrated in FIG. 3. The enlarged section 40 is arranged to surround an associated post 26 with a free end of a flexible tube or conduit (to be described) fitted thereover. The flexible tube or conduit extends through the narrow section 42. The junction between the enlarged and narrow section of each bore forms an annular shoulder 44. The intersection 45 of the shoulder and the narrow passageway 42 serves as a relatively sharp annular edge 45 for compressing (or pinching) the tube or conduit against the chamfered end 28 of the post 26, as is shown in FIG. 8. The compression disk defines three anti-rotational cavities in the form of blind bores 46 which receive and cooperate with the pins 30 to prevent the compression disk 36 from rotating relative to the body member as the disk 36 is being forced into a seated engagement with the body member.

The outer wall of the compression disk is stepped to form a major surface 48 joined to a minor surface 50 via a shoulder 52.

Figure 6:
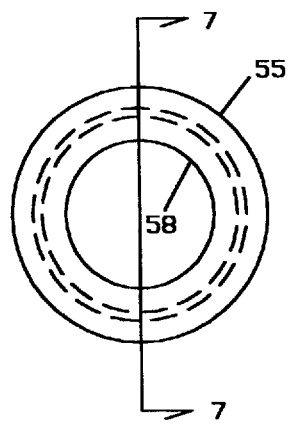
FIG. 6 is an end view of a nut for use in the assembly.
Figure 7:
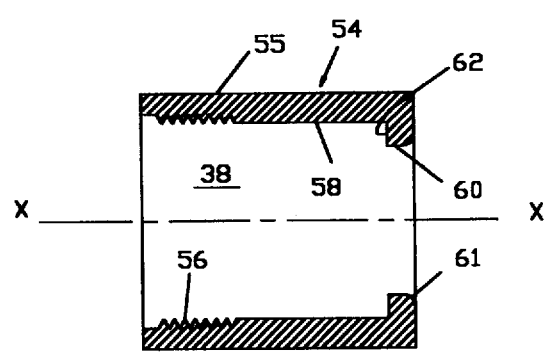
FIG. 7 is a cross-sectional view of the nut taken along lines 7—7 of FIG. 6.

A nut 54 for carrying the compression disk and seating it against the body member is shown in FIGS. 6 and 7. The nut 54 includes an outer cylindrical wall 55 and internal threads at 56 for threadably engaging the threads 16 on the body member. The compression disk 36 is rotatably supported within the nut with the major and minor surfaces 48 and 50 of the disk outer wall being positioned within inner cylindrical wall surfaces 58 and 60 of the nut, respectively. An inwardly projecting shoulder 62 of the nut extends between the surfaces 58 and 60. The shoulder 62 engages the shoulder 52 of the compression disk to drive the disk against the body member when the nut is tightened thereon. If desired, the outer wall 55 of the nut may be knurled to provide a gripping surface to facilitate the assembly process.

To retain the disk 36 within the nut 54 the disk may be provided with a raised annular ridge 51 (FIG. 4) at the free end of surface 50 with the ridge being arranged to snap over into the recess 61 at the distal end of the nut 54 as shown in FIG. 8.

The body member, compression disk and nut are shown in an assembled condition in FIG. 8 with flexible tubes 60 fitted over the posts 26. As will be noted, the tubing is pinched against the chamfered portions 28 of the posts by the edges 45. The body member and compression disk are preferably molded from a suitable plastic such as teflon, PFA or PVDF.

Figure 9:
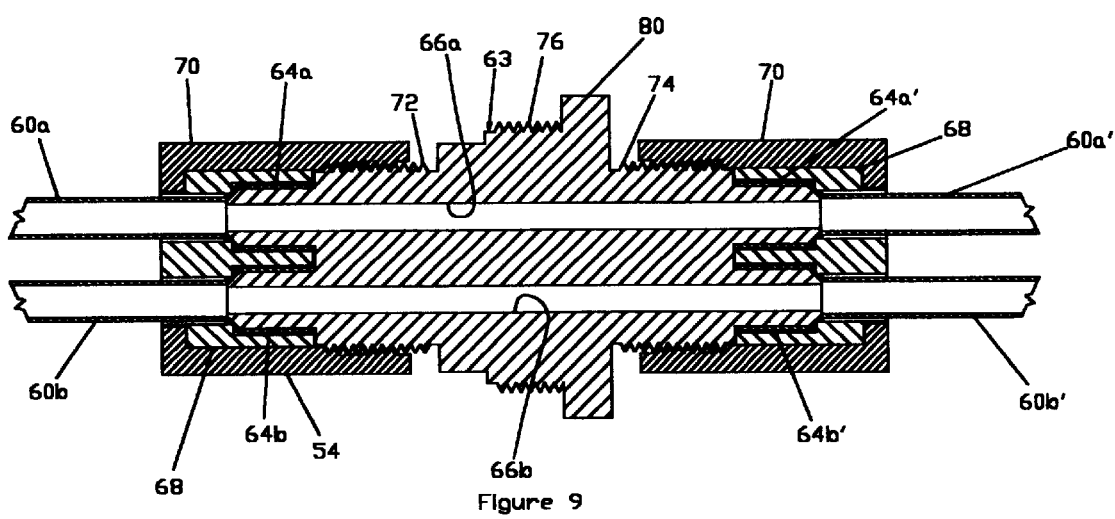
FIG. 9 is a cross-sectional view of an alternative fitting assembly arranged to interconnect a plurality of incoming and outgoing tubes.

Referring now to FIG. 9, there is illustrated a compression fitting assembly for individually interconnecting a plurality (i.e., 2) of incoming tubes to a plurality of outgoing tubes. More specifically, incoming tubes 60a and 60b are connected to outgoing tubes 60a' and 60b'. The tubes are interconnected via a body member 63 which includes proximal nipples 64a and 64b and distal nipples 64a' and 64b'. Internal passageways 66a and 66b interconnect nipples 64a to 64a' and 64b to 64b', respectively. Compression disks 68 and nuts 70 complete the assembly. The compression disks 68 and nuts 70 may be identical to the disk 36 and nut 54, except in case of FIG. 9, only two (instead of three) tubes are to be connected to the body. It should be noted that the number of tubes to be interconnected is a matter of choice. The body member 63 includes proximal and distal female threads 72 and 74 for mating with the threads 56 on the nuts and external threads 76 which may be used to secure the body against a bulkhead. The body member 63 also includes a faceted flange section 80 for accommodating a wrench to stabilize the body during assembly.

A novel compression fitting assembly has been described which is simple, inexpensive and capable of connecting a plurality of individual flexible tubes to a common line or interconnecting a plurality of incoming and outgoing tubes. The fitting eliminates the need for individual coupling devices and overcomes the creep problem associated with the use of ferrule-type fittings and insures a uniform compressive forces between the tubes and the fitting assembly. Various modifications to the fitting assembly will become apparent to those skilled in the art without involving any departure from the spirit and scope of the invention as defined in the claims appended hereto.

What is claimed is:

1. A multiflare compression fitting assembly for interconnecting a plurality of flexible tubular conduits comprising:

a body member having a longitudinal axis with external threads formed on at least one end thereof, a plurality of axially extending cylindrical posts adjacent the threaded end of the body member, each of the posts having a free end and an outer wall adapted to receive an end of one of the tubular conduits and defining an inner passageway therethrough, the body member having at least one internal passageway in fluid communication with the passageways in the posts;

a compression disk having a longitudinal axis, the disk defining a plurality of axial passageways, each passageway being aligned with the passageway in a respective post when the longitudinal axes of the disk and body member are coincident, each passageway in the disk having a narrow section for receiving one of the conduits and an enlarged section adapted to surround the outer wall of one of the posts with said end of one of the conduits extending thereover, the disk being arranged to compress a conduit against the outer wall of the free end of the post when the disk is seated against the body member;

a nut having a stepped bore of first and second diameters therethrough, the first diameter having internal threads adapted to engage the threaded end of the body member, the second diameter being adapted to accommodate the passage of said plurality of tubular conduits therethrough, the junction between the first and second bores being adapted to engage the compression disk and force the disk into its seated position against the body member when the nut is tightened on the body member, the disk being fee to rotate relative to the nut; and anti-rotation means carried by the body member and the compression disk for substantially preventing the application of nonuniform compressive forces on the outer walls of the conduits inserted over the posts, as the nut is tightened on the body member.

2. The compression fitting assembly of claim 1 wherein the anti-rotation means comprises at least one latch formed on the body member or the compression disk and a cooperating cavity formed on the other body member or disk.

3. The compression fitting assembly of claim 2 wherein the latch is in the form of one or more axially protruding pins and the cavity is in the form of a cooperating blind bore.

4. The compression fitting assembly of claim 3 wherein the pins are carried by the body member.

5. The compression fitting assembly of claim 1 wherein the body member is in the form of a manifold with said at least one internal passageway comprising a single passageway.

6. The compression fitting assembly of claim 1 wherein the body member includes external threads formed on the other end thereof with a plurality of hollow cylindrical posts adjacent therefrom and wherein said at least one internal passageway comprises at least two internal passageways interconnecting at least two of the hollow posts at said other end with the inner passageways of at least two different posts at said one end.

7. The compression fitting assembly of claim 6 wherein the same number of posts are formed on each end of the body member with each post at one end being associated with one post at the other end and wherein said at least two internal passageways comprises a separate passageway interconnecting each pair of associated posts.

8. The compression fitting assembly of claim 2 wherein the outer wall of each of the posts is tapered at the free end and wherein the stepped bores in the compression disk form an annular edge at the entrance to the second passageway which is arranged to pinch a respective tubular conduit against the tapered portion of the outer wall of each post.

9. In a multiflare compression fitting assembly for interconnecting a plurality of flexible tubular conduits, the combination comprising:

a body member having external threads at a first end with a plurality of nipples extending axially outwardly from the first end, each of the nipples having a fluid passageway therethrough, the body member having at least one internal passageway in fluid communication with the passageways in each of the nipples;

a nut adapted to threadably engage the threaded end of the body member;

a compression disk rotatably carried by the nut and having a plurality of bores corresponding to the nipples in the body member, the bores being stepped with the smaller diameter of each stepped bore having a diameter larger than the diameter of the tubular conduits, but smaller than the diameter of the nipples, and the larger diameter of stepped bore being adapted to encircle one of the nipples with a conduit fitted thereover, whereby when the nut is tightened onto the threaded end of the body member the stepped bores in the compression disk are forced into registry with the nipples on the body member to provide a compression fit between the conduits and the nipples; and anti-rotation means carried by the body member and the compression disk for substantially preventing the application of nonuniform compressive forces on the tubular conduits fitted over the nipples as the nut is tightened onto the body member.

10. The compression fitting assembly of claim 9 wherein the antirotation means comprises at least one protruding pin carried by the body member or the compression disk and a cooperating bore carried by the other.

11. The compression fitting assembly of claim 10 wherein each of the nipples has an outer wall with a cylindrical section adjacent the first end of the body member and a tapered section adjacent a free end of the nipple and wherein the stepped bores in the compression disk form relatively sharp edges which are arranged to compress the conduits against the tapered sections of the outer wall of the nipples.

12. The compression fitting assembly of claim 11 wherein the body member is in the form of a manifold with said at least one internal passageway comprising a single passageway.

* * * * *